(12) United States Patent
Stündl (10) Patent No.: US 9,067,375 B2
(45) Date of Patent: Jun. 30, 2015

(54) DEVICE FOR GUIDING AND TEXTURING A PLURALITY OF SYNTHETIC THREADS

(75) Inventor: Mathias Stündl, Wedel (DE)

(73) Assignee: Oerlikon Textile GmbH & Co. KG, Remscheid (DE)

( * ) Notice: Subject to any disclaimer, the term of this patent is extended or adjusted under 35 U.S.C. 154(b) by 0 days.

(21) Appl. No.: 14/241,767

(22) PCT Filed: Sep. 3, 2012

(86) PCT No.: PCT/EP2012/067064
§ 371 (c)(1),
(2), (4) Date: May 20, 2014

(87) PCT Pub. No.: WO2013/034511
PCT Pub. Date: Mar. 14, 2013

(65) Prior Publication Data
US 2014/0356474 A1    Dec. 4, 2014

(30) Foreign Application Priority Data

Sep. 7, 2011    (DE) .......................... 10 2011 112 865

(51) Int. Cl.
*D02G 1/12*      (2006.01)
*D02G 1/14*      (2006.01)
(Continued)

(52) U.S. Cl.
CPC .............. *B29D 99/0078* (2013.01); *D02G 1/14* (2013.01); *D02G 1/0266* (2013.01); *D02G 1/12* (2013.01); *D02G 1/16* (2013.01); *D02G 1/20* (2013.01); *B29L 2031/731* (2013.01)

(58) Field of Classification Search
CPC ..................... B29D 99/0078; B29L 2031/731; D02G 1/0266; D02G 1/12; D02G 1/14; D02G 1/16; D02G 1/20
See application file for complete search history.

(56) References Cited

U.S. PATENT DOCUMENTS

| 5,524,841 | A | 6/1996 | Rijk et al. |
| 6,253,430 | B1 | 7/2001 | Wirz |
| 7,086,130 | B2 * | 8/2006 | Jahns et al. ..................... 28/258 |

FOREIGN PATENT DOCUMENTS

| EP | 1449945 A2 | 8/2004 |
| EP | 1614782 A1 | 1/2006 |

*Primary Examiner* — Yogendra Gupta
*Assistant Examiner* — Joseph Leyson
(74) *Attorney, Agent, or Firm* — BainwoodHuang (57) ABSTRACT

The exemplary embodiment illustrated in FIGS. 1 to 3 of the device according to the invention is by way of example with respect to the structure and arrangement of the individual assemblies. In principle, it is also possible for the godet assigned to the texturing unit 3 to guide the threads only with a single partial looping. The invention is thus particularly suitable for producing a uniform crimp on each tread in a thread group of a plurality of threads. The number of threads within the thread group is shown by way of example with three threads. The tread group can contain two or more threads. The invention is particularly advantageous in the use of what are known as twist texturing nozzles, in which a twist is produced on the incoming thread. By avoiding friction points and deflections, and identical effect of the twist can be obtained on each of the supplied threads. In addition, very compact arrangements can be realized, since the texturing nozzles can be arranged at a relatively short distance downstream of the godet. Minimum distances for maintaining maximum angles of deflection are not necessary. Thus, even relatively large differences between guiding distance and the treatment distance can be realized at a short distance between the godet and the texturing unit.

8 Claims, 4 Drawing Sheets

(51) Int. Cl.
  *D02G 1/16* (2006.01)
  *D02G 1/20* (2006.01)
  *B29D 99/00* (2010.01)
  *D02G 1/02* (2006.01)
  *B29L 31/00* (2006.01)

DEVICE FOR GUIDING AND TEXTURING A PLURALITY OF SYNTHETIC THREADS

BACKGROUND

The invention relates to a device for guiding and texturing a plurality of synthetic threads in a melt spinning process according to the preamble to Claim 1.

In the production of crimped threads in a melt spinning process, it is customary for the threads to be guided and treated together as a thread group after the extrusion. Thus it is customary for the threads to be guided jointly, spaced apart from one another, on the circumference of godets. Depending upon the respective treatment step and the respective treatment units, different thread spacings are required between the threads. Thus, for example, when extruding the threads, a spinning gauge, which defines the spacing of the spinnerets relative to one another, should be maintained. After the extrusion, for guiding on the godets, the threads can be guided into a substantially narrower treatment spacing relative to one another. The different thread spacings require that the threads must be either spread or combined. Since all threads of the thread bundle of a thread group must be produced and treated as far as possible under the same conditions, the deflections of the individual threads are limited in order to keep the thread tensions acting on the threads the same as far as possible. This often results in very long transition zones in order to guide the threads from a short thread spacing to a large thread spacing. Such spreading or combining can be assisted by additional thread guides, but these basically have the disadvantage that each thread guide produces a mechanical loading in the thread and thus an additional thread tensile force. Therefore, such unwanted friction points are avoided as far as possible during guiding of the threads. Therefore, in particular during the production of crimped threads, care should be taken to ensure that no irregularities are produced due to different thread guides. In this case, the feed to the texturing units, in which crimping of the filament strands in the threads is produced, is particularly sensitive.

From the prior art, a device for guiding and texturing a plurality of synthetic threads in a melt spinning process is known from the EP 1 449 945 A2, in which the threads of a thread bundle are spread between a godet and a cooling arrangement, wherein the texturing nozzles disposed between the godet and the cooling arrangement are held in a fan shape, so that no deflections and kinks occur at the inlet of the texturing nozzles. The texturing nozzles form a texturing plane which is oriented parallel to the godet.

However, in the known device, the threads are spread directly after run-off the circumference of the godet and guided obliquely over the godet. Here the problem exists that, in particular in the case of threads made of polymers which tend to stick to godets, tearing of individual filaments occurs, or that in the case of the multi-coloured threads, the effects of friction on the godet lead to colour irregularities.

Therefore, the object of the invention is to improve a generic device for guiding and texturing a plurality of synthetic threads in a melt spinning process in such a way that in the transition from the godet to the texturing nozzle the threads can be guided without kinks and deflections.

SUMMARY

According to the invention, this object is achieved in that the arrangement of the texturing nozzles is oriented transversely with respect to an axis of rotation of the godet in such a way that the threads with different looping angles on the circumference of the godet can be fed to the texturing nozzles in a straight thread run.

Advantageous modifications of the invention are defined by the features and combinations of features of the respective subordinate claims.

The invention is characterised in that the threads can be fed to the texturing nozzles in the straight thread run without any change to the treatment spacing set on the circumference of the godet. This aim is achieved by an offset arrangement of the texturing nozzles transversely with respect to the godet axis, so that the run-off points of the threads formed by different looping angles, in each case with the texturing nozzles disposed thereunder, span a tangential plane for guiding the respective thread. Thus every thread of the thread bundle can be guided without deflection from the circumference of the godet into the texturing nozzles disposed downstream.

The looping difference between the threads on the circumference of the godet is chosen in such a way that the required spreading occurs due to the fan-shaped arrangement of the texturing nozzles, so that as the threads enter the texturing nozzles, no deflections are necessary.

In order to be able to guide the threads during texturing and aftertreatment in a thread run plane, a modification of the invention is provided in which the texturing nozzles form a texturing plane and in which an angle is formed between the texturing plane and the axis of rotation of the godet. The texturing nozzles may be disposed a short distance from the godet in order to feed the threads in a plane of the subsequent cooling arrangement. Depending upon the number of threads and depending upon the size of the treatment spacing between the threads on the circumference of the godet, the angle between the axis of rotation of the godet and the texturing plane is in a range between 30° and 90°.

In order to form the crimping, a stuffer box is associated in each case with the texturing nozzles, and together with the associated texturing nozzle, forms a thread guide axis which is tangent to the circumference of the godet, wherein the stuffer boxes on an outlet form the treatment spacing between them. Thus a deflection-free spreading of the thread bundle from the circumference of the godet to the following cooling arrangement can be produced solely by the arrangement of the texturing nozzles and stuffer boxes.

The cooling arrangement is preferably formed by a rotatably mounted cooling drum, the axis of rotation of which is oriented at an angle to the axis of rotation of the godet. Thus the thread plugs produced by the stuffer boxes can be guided parallel adjacent to one another and are cooled on the circumference of the cooling drum.

In this case, an angle which is formed between the axis of rotation of the cooling drum and the axis of rotation of the godet is preferably in a range from 30° to 90°. This angle is preferably equal to the angle between the texturing plane and the axis of rotation of the godet. In this way it is ensured that each thread plug guided on the cooling drum acquires the same cooled length.

In order to guide the thread bundle, as it is drawn off from the cooling drum, from the treatment spacing to a smaller guiding spacing on the circumference of a draw-off godet, a modification of the invention is preferably used in which a draw-off godet for drawing off the threads is disposed downstream of the cooling arrangement, the axis of rotation of said draw-off godet being oriented at an angle to the axis of rotation of the cooling drum. Thus the threads can be received in offset points of incidence on the circumference of the draw-off godet in such a way that a desired guiding spacing is set automatically at the transition of the threads from the cooling drum to the draw-off godet. Thus additional friction points can be avoided by thread routing elements.

For the case where the threads are to be guided subject to the same characteristics on the godet and the draw-off godet, a modification of the invention is particularly advantageous in which the axis of rotation of the draw-off godet is oriented parallel to the axis of rotation of the godet. Thus the geometric arrangements for guiding the thread at as it runs onto and off from the cooling drum can be standardised.

The invention can be used particularly advantageously in texturing nozzles which produce twisting. Thus it is generally known to support the run-in of the synthetic threads into the texturing nozzles by an imposed twist. The twist can propagate on the thread as far as the godet, in order to obtain a draw-off of the filament strands in the thread which is as uniform as possible. Due to the deflection-free guiding there is no hindrance to the twisting, so that a substantial effect can be achieved in the threads.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

In the drawings.

DETAILED DESCRIPTION

Figure 1:
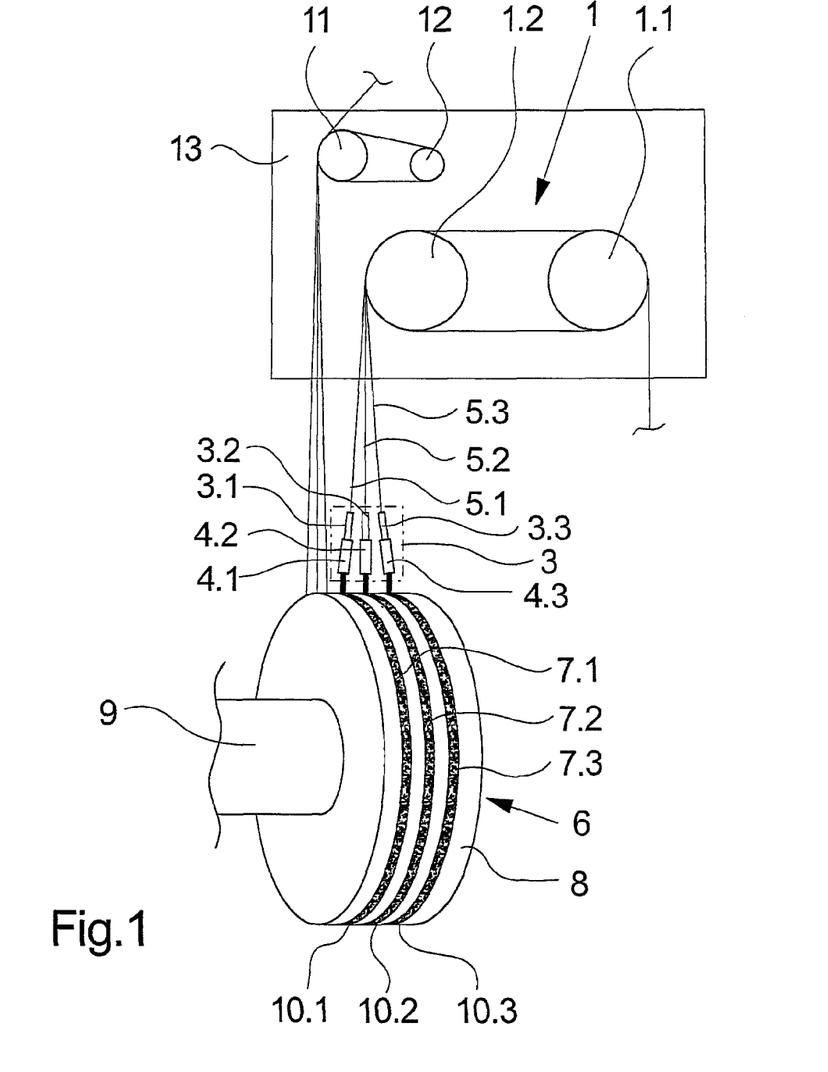
FIG. 1 shows schematically a front view of the embodiment of the device according to the invention.
Figure 2:
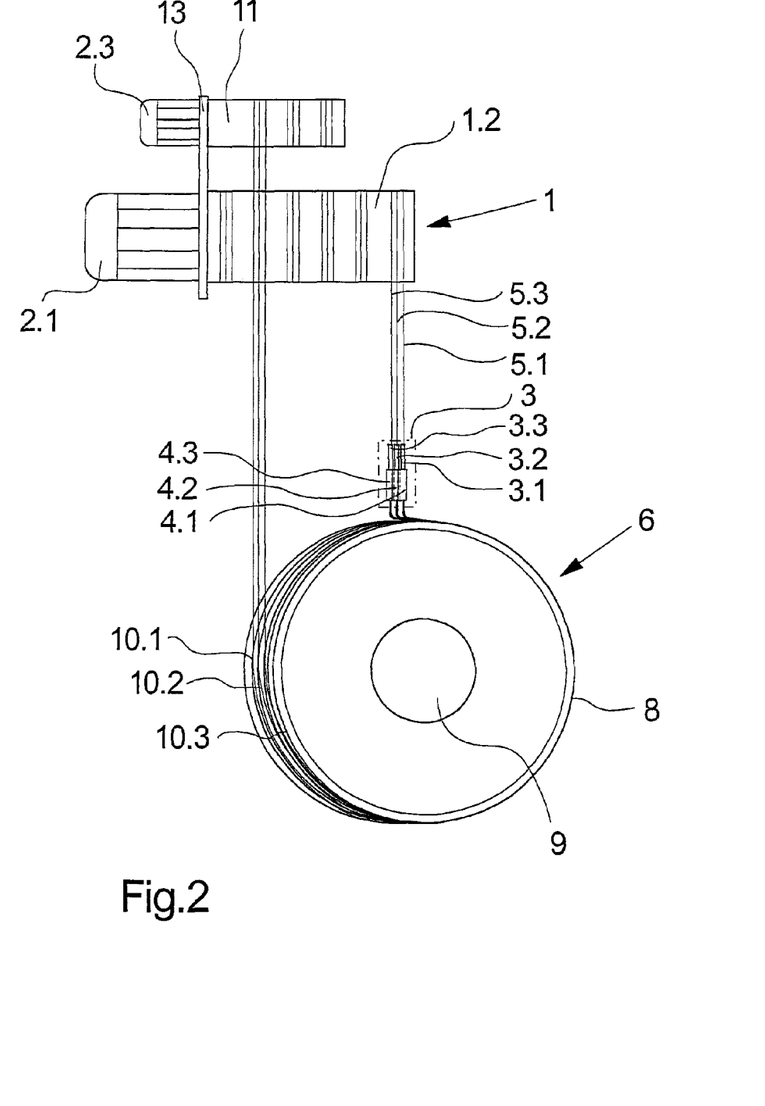
FIG. 2 shows schematically a side view of the embodiment of FIG. 1.
Figure 3:
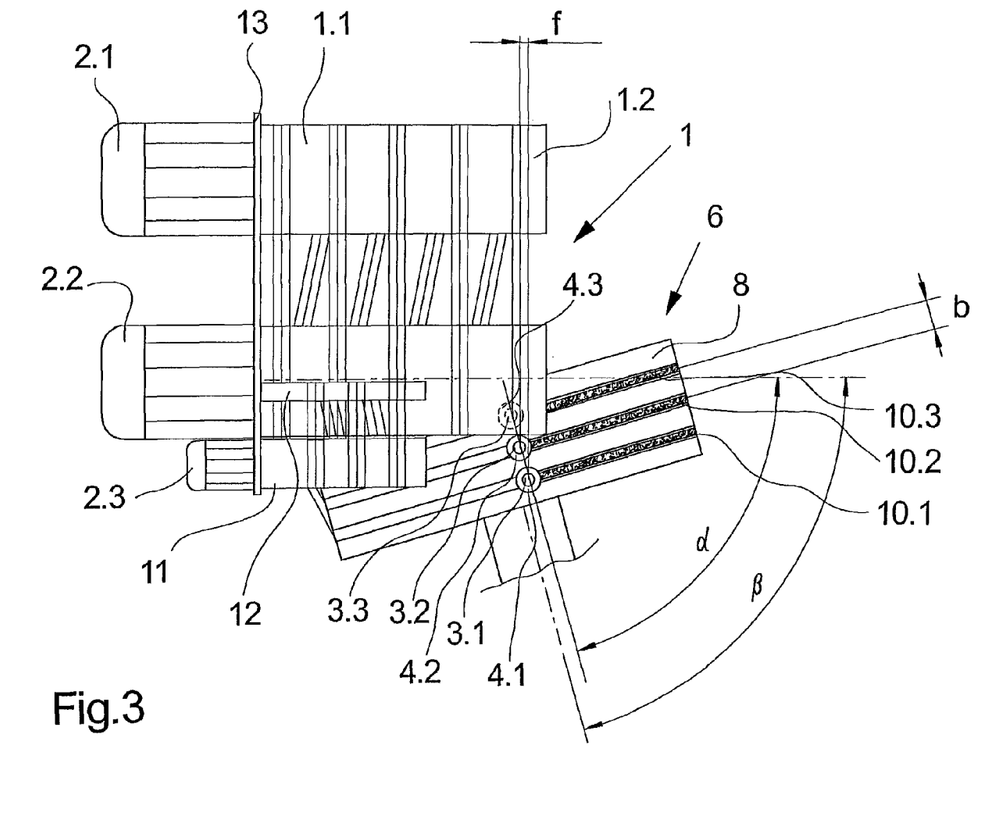
FIG. 3 shows schematically a plan view of the embodiment of FIG. 1.

In FIGS. 1 to 3 an embodiment of the device according to the invention for guiding and texturing a plurality of synthetic threads, which could be used in a melt spinning process, is shown in a plurality of views shown. FIG. 1 shows the device in a front view, FIG. 2 shows the device in a side view and FIG. 3 shows the device in a plan view. In so far as no explicit reference is made to one of the figures, the following description applies to all figures.

In this embodiment of the device, according to the invention, a godet duo 1 is provided with the godets 1.1 and 1.2 in order to draw off a thread bundle immediately from a spinning device or to draw it inside a drawing device. The godets 1.1 and 1.2 are looped around a number of times by the thread bundle, which in this embodiment is formed by the threads 5.1, 5.2 and 5.3. For better understanding of the device, the thread runs of the threads 5.1 until 5.3 are also shown in FIGS. 1 to 3.

The godets 1.1 and 1.2 are driven by means of the godet drives 2.1 and 2.2. The godets 1.1 and 1.2 are held so as to project on a machine frame 13, so that the drives 2.1 and 2.2 are associated with the godets 1.1 and 1.2 on the machine frame 13.

A texturing unit 3 which comprises a plurality of texturing nozzles 3.1, 3.2 and 3.3 is associated with the godet duo 1. In this embodiment the texturing unit 3 has a respective texturing nozzle 3.1 to 3.3 for each of the threads 5.1 to 5.3.

A stuffer box 4.1, 4.2 and 4.3 is in each case associated with the texturing nozzles 3.1, 3.2 and 3.3. Thus the texturing nozzles 3.1 and the stuffer box 4.1 form a unit, in order to texture the thread 5.1. Accordingly the texturing nozzle 3.2 and the stuffer box 4.2 as well as the texturing nozzle 3.3 and the stuffer box 4.3 are combined into a treatment unit.

The functioning of such texturing nozzles and stuffer boxes is sufficiently known and is described, for example, in EP 1 614 782 A1. In this respect, reference is made at this point to the aforementioned document.

At this point it should also be mentioned that the texturing unit 3 can hold the texturing nozzles 3.1, 3.2 and 3.3 as well as the stuffer boxes 4.1, 4.2 and 4.3 in a common housing or alternatively in three separate housing parts.

A cooling arrangement 6 is disposed below the texturing unit 3 in order to receive and to cool the thread plugs 7.1, 7.2 and 7.3 produced by the texturing units 3. Since the threads 5.1, 5.2 and 5.3 in the texturing unit 3 are compressed by means of a hot fluid to form the thread plugs 7.1, 7.2 and 7.3, a thermal aftertreatment is carried out by the cooling arrangement 6. For this purpose the cooling arrangement 6 is constructed as a cooling drum 8 which has a plurality of circumferential cooling grooves 10.1, 10.2 and 10.3. The cooling grooves 10.1, 10.2 and 10.3 are constructed adjacent to one another on the circumference of the cooling drum 8 and have gas-permeable groove walls, so that a thermal treatment of the thread plugs 7.1 to 7.3 on the circumference of the cooling drum 8 is possible by temperature-controlled air. In this case the cooling drum 8 is driven about an axis of rotation 9.

The cooling grooves 10.1, 10.2 and 10.3 constructed on the circumference of the cooling drum 8 form between them a treatment spacing in which the thread plugs 7.1, 7.2 and 7.3 are guided parallel adjacent to one another. The stuffer boxes 4.1, 4.2 and 4.3 are associated directly with the cooling grooves 10.1, 10.2 and 10.3 of the cooling drum 8, so that the outlets of the stuffer box 4.1, 4.2 and 4.3 likewise form the treatment spacing. The treatment spacing is identified by the lower-case letter b in FIG. 3.

As can be seen from the representation in FIG. 3, the threads 5.1, 5.2 and 5.3 are guided relative to one another on the circumference of the godets 1.1 and 1.2 at a guiding spacing. The treatment spacing is identified by the lower-case letter b in FIG. 3. The guiding spacing f is substantially smaller by comparison with the treatment spacing b, so that spreading of the threads 5.1, 5.2 and 5.3 is necessary at the transition from the godet 1.2 to the cooling drum 8.

As can be seen from the representation in FIGS. 1 to 3, in order to avoid deflections and kinks, in particular of the outer threads 5.1 and 5.3, the texturing nozzles 3.1, 3.2 and 3.3 are held in a fan-shaped arrangement between the godets 1.2 and the cooling drum 8. In this case the arrangement of the texturing nozzles 3.1, 3.2 and 3.3 is oriented transversely with respect to an axis of rotation of the godet 1.2 in such a way that the threads 5.1, 5.2 and 5.3 can be fed with different looping angles on the circumference of the godet 1.2 to the texturing nozzles 3.1, 3.2, 3.3 in a straight thread run without deflection. The spreading of the threads 5.1, 5.2 and 5.3 takes place through an offset of the run-off points of the threads in the circumferential direction of the godet 1.2. This situation is clarified in particular in FIG. 4.

Figure 4:
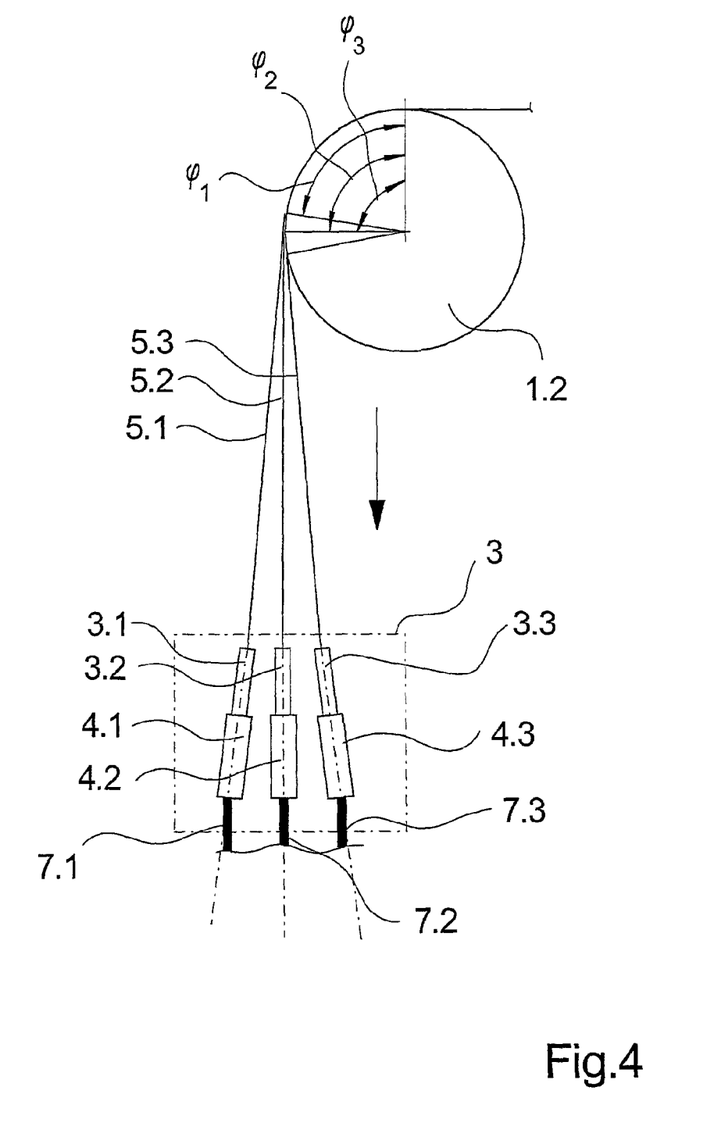
FIG. 4 shows schematically a detail of the side view of the embodiment of FIG. 1.

FIG. 4 shows an enlarged detail of the front view of the embodiment of FIG. 1. The texturing nozzles 3.1 until 3.3 are held in a fan shape relative to one another, wherein in each case an offset which protrudes into the drawing plane is constructed between the texturing nozzles 3.1, 3.2 and 3.3.

The offset of the texturing nozzles 3.1, 3.2 and 3.3 corresponds to the guiding spacing f. Thus each of the texturing nozzles 3.1, 3.2 and 3.3 is located directly in the thread run plane of the respective thread 5.1, 5.2 and 5.3.

As can be seen from the representation in FIG. 4, the texturing nozzles 3.1, 3.2 and 3.3 each form, with the associated stuffer boxes 4.1, 4.2 and 4.3, a thread guiding axis that is tangent to the circumference of the godet 1.2. Thus the tangential contact points of the guide axes form the respective run-off points of the thread. FIG. 4 illustrates the situation in which the looping angle of the threads 5.1, 5.2 and 5.3 are shown on the godet 1.2. The looping angles are identified by the reference signs $\phi_1$, $\phi_2$, and $\phi_3$. Thus in the last loop on the godet 1.2 the thread 5.1 has the looping angle $\phi_1$. Accordingly the looping angles of the threads 5.2 and 5.3 are shown by $\phi_2$, and $\phi_3$. The looping angles $\phi_1$, $\phi_2$, and $\phi_3$ are of different sizes, so that spreading occurs as the threads 5.1, 5.2 and 5.3 run off. Each of the threads 5.1 to 5.3 is fed in the straight thread run to the texturing nozzles 3.1 to 3.3. Unwanted deflections do not occur on the threads 5.1 to 5.3 at the run-off from the godet 1.2 nor at the entry into the texturing nozzles 3.1 until 3.3.

As can be seen from the representations in FIGS. 1 to 3, the texturing nozzles 3.1 to 3.3 and the associated stuffer boxes 4.1 to 4.3 are held adjacent to one another in a plane which is designated here as a texturing plane. The texturing plane forms with an axis of rotation of the godet 1.2 an angle which is shown in FIG. 3 with the reference sign $\alpha$. A geometric arrangement that enables a deflection-free spreading of the thread bundle with a predetermined guiding spacing f and treatment spacing b is determined by the angle $\alpha$. The angle $\alpha$ between the axis of rotation of the godet 1.2 and the texturing plane is usually in the range between 30° and 90°.

In order for the thread plugs 7.1 until 7.3 produced in the texturing plane to be further treated uniformly, the cooling drum 8 disposed downstream is likewise held in a defined geometric arrangement relative to the godet 1.2. This situation is clarified in particular in FIG. 3. Thus an angle which is shown in FIG. 3 by the reference sign $\beta$ is formed between the axis of rotation of the godet 1.2 and the axis of rotation of the cooling drum 8. The angle $\beta$ is likewise in the range between 30° and 90°. In order to obtain the most uniform treatment possible of all threads, the angle $\beta$ between the cooling drum 8 and the godet 1.2 is preferably the same size as the angle $\alpha$ between the texturing plane of the texturing nozzles 3.1 until 3.3 and the axis of rotation of the godet 1.2.

In the embodiment illustrated in FIGS. 1 to 3 the cooling drum 8 is driven in a clockwise direction, wherein the thread plugs 7.1 to 7.3 are guided with a partial looping in the cooling grooves 10.1 to 10.3. For drawing off the crimped threads and for breaking up the thread plugs 7.1 to 7.3, a draw-off godet 11 is disposed downstream of the cooling drum 8. The draw-off godet 11 co-operates with a freely rotatably mounted deflecting roller 12 which are held together on the machine frame 13. The draw-off godet 11 is driven by means of a godet drive 2.3. Since the threads 5.1, 5.2 and 5.3 on the draw-off godet 11 are likewise guided with a guiding spacing which is smaller than the treatment spacing, the draw-off godet 11 is held at an angle to the cooling drum 8. In order to obtain guiding spacings which are as equal as possible on the draw-off godet 11, the axes of rotation of the draw-off godet 11 and of the godet 1.2 are preferably designed to be parallel. Thus at the transition of the threads from the cooling drum 8 to the draw-off godet 11 the angled offset can be used in order to combine the threads for guiding on the draw-off godet 11 to a parallel run with a guiding spacing. Thus any thread routing elements and thread guiding means can be advantageously avoided in the thread run between the draw-off godet 11 and the cooling drum 8.

The embodiment of the device according to the invention illustrated in FIGS. 1 to 3 is exemplary for the structure and arrangement of the individual units. Basically there is also the possibility that the godet associated with the texturing unit 3 only guides with an individual partial looping. Thus the invention is particularly suitable for producing a uniform crimping on each thread in a thread bundle of a plurality of threads. The number of threads within the thread bundle is shown by way of example as comprising three threads. The thread bundle may contain two or more threads. The invention is particularly advantageous when so-called twist texturing nozzles are used, in which a twist is produced on the incoming thread. By avoiding friction points and deflections, the same twisting effect is obtained on each of the delivered threads. Moreover, very compact arrangements can be produced, since the texturing nozzles can be disposed downstream of the godet at a relatively short spacing. Minimum spacings in order to maintain maximum deflection angles are not necessary. Thus greater differences can also be produced between the guiding spacing and the treatment spacing at a short distance between the godet and the texturing unit.

LIST OF REFERENCE NUMERALS 1. godet duo
1.1, 1.2 godet
2.1, 2.2, 2.3 godet drive
3 texturing unit
3.1, 3.2, 3.3 texturing nozzles
4.1, 4.2, 4.3 stuffer box
5.1, 5.2, 5.3 thread
6 cooling arrangement
7.1, 7.2, 7.3 thread plug
8 cooling drum
9 axis of rotation
10.1, 10.2, 10.3 cooling grooves
11 draw-off godet
12 deflecting roller
13 machine frame

What is claimed is:

1. Device for guiding and texturing a plurality of synthetic threads in a melt spinning process, comprising:
   at least one driven godet, with a plurality of texturing nozzles and with a cooling arrangement,
   wherein the threads can be guided on the circumference of the godet with a guiding spacing and on the cooling arrangement with a treatment spacing,
   wherein the guiding spacing between the threads on the godet is smaller than the treatment spacing between the threads on the cooling arrangement,
   wherein the texturing nozzles are held in a fan-shaped arrangement between the godet and the cooling arrangement, and
   wherein the arrangement of the texturing nozzles is oriented transversely with respect to an axis of rotation of the godet in such a way that the threads can be fed with different looping angles on the circumference of the godet to the texturing nozzles in a straight thread run.

2. Device according to claim 1, wherein a stuffer box is associated in each case with the texturing nozzles and together with the associated texturing nozzle forms a thread guide axis which is tangent to the circumference of the godet, and wherein the stuffer boxes on an outlet form the treatment spacing between them.

3. Device according to claim 1, wherein the cooling arrangement is formed by a rotatably mounted cooling drum with a plurality of circumferential cooling grooves, the axis of rotation of said drum being oriented at an angle to the axis of rotation of the godet.

4. Device according to claim 3, wherein an angle between the axis of rotation of the cooling drum and the axis of rotation of the godet is in the range between 30° and 90°.

5. Device according to claim 3, wherein the angle between the axis of rotation of the cooling drum and the axis of rotation of the godet is equal to the angle between the texturing plane of the texturing nozzles and the axis of rotation of the godet.

6. Device according to claim 3, wherein a draw-off godet for drawing off the threads is disposed downstream of the cooling arrangement, the axis of rotation of said draw-off godet being oriented at an angle to the axis of rotation of the cooling drum.

7. Device according to claim 6, wherein the axis of rotation of the draw-off godet is oriented parallel to the axis of rotation of the godet.

8. Device for guiding and texiuring a plurality of synthetic threads in a melt spinning process, comprising:

at least one driven godet, with a plurality of texturing nozzles and with a cooling arrangement, wherein the threads can be guided on the circumference of the godet with a guiding spacing and on the cooling arrangement with a treatment spacing, wherein the guiding spacing between the threads on the godet is smaller than the treatment spacing between the threads on the cooling arrangement, wherein the texturing nozzles are held in a fan-shaped arrangement between the godet and the cooling arrangement, wherein the texturing nozzles form a texturing plane and wherein an angle is formed between the texturing plane and the axis of rotation of the godet in such a way that the threads can be fed with different looping angles on the circumference of the godet to the texturing nozzles in a straight thread run, and wherein the angle between the axis of rotation of the godet and the texturing plane of the texturing nozzle is in the range between 30° and 90°.

\* \* \* \* \*

UNITED STATES PATENT AND TRADEMARK OFFICE
CERTIFICATE OF CORRECTION

PATENT NO.       : 9,067,375 B2
APPLICATION NO.  : 14/241767
DATED            : June 30, 2015
INVENTOR(S)      : Mathias Stündl

Page 1 of 1

It is certified that error appears in the above-identified patent and that said Letters Patent is hereby corrected as shown below:

In the Claims

Claim 2, Column 6, Line 62, "sluffer" should read -- stuffer --.

Signed and Sealed this
Twelfth Day of April, 2016

Michelle K. Lee
*Director of the United States Patent and Trademark Office*